(12) United States Patent
Kempa et al.

(10) Patent No.: US 7,841,507 B2
(45) Date of Patent: Nov. 30, 2010

(54) FUSION WELDING PROCESS TO JOIN ALUMINUM AND TITANIUM

(75) Inventors: Stefan Kempa, Feuerthalen (CH); Urs Schuepbach, Neuhausen (CH)

(73) Assignee: Engineered Products Switzerland Ltd., Zurich (CH)

( * ) Notice: Subject to any disclaimer, the term of this patent is extended or adjusted under 35 U.S.C. 154(b) by 0 days.

(21) Appl. No.: 12/497,945

(22) Filed: Jul. 6, 2009

(65) Prior Publication Data

US 2010/0001133 A1 Jan. 7, 2010

Related U.S. Application Data

(60) Provisional application No. 61/078,614, filed on Jul. 7, 2008.

(30) Foreign Application Priority Data

Jul. 7, 2008 (EP) .................................. 08356105

(51) Int. Cl.
*B23K 31/02* (2006.01)
*B23K 9/00* (2006.01)
*B23K 35/24* (2006.01)

(52) U.S. Cl. ................ 228/165; 228/171; 228/174; 228/262.51; 228/262.72; 219/54; 219/76.14; 428/544

(58) Field of Classification Search ............... None
See application file for complete search history.

(56) References Cited

U.S. PATENT DOCUMENTS 2,761,047 A 8/1956 Meredith (Continued)

FOREIGN PATENT DOCUMENTS

JP 60118389 6/1985

(Continued)

OTHER PUBLICATIONS

International Search Report from EP 08356105 dated Dec. 12, 2008 (2 pages).*

(Continued)

*Primary Examiner*—Kiley Stoner
(74) *Attorney, Agent, or Firm*—Baker Donelson Bearman Caldwell & Berkowitz, PC

(57) ABSTRACT

The invention concerns a process for joining a first member (1) comprising an aluminum alloy to a second member (2) comprising a titanium alloy and having at least one edge with a thickness e,
comprising the steps of
(i) chamfering said edge of said second member into a tapered truncated shape having on a first side a first tapering angle $\alpha 1$, on a second side a second tapering angle $\alpha 2$ and a minimum thickness t, wherein $\alpha 1$ and $\alpha 2$ are greater than or equal to zero, the sum of $\alpha 1$ and $\alpha 2$ is between 10° and 50° and t is between 0.05 e and 0.3 e,
(ii) placing said first member and said chamfered edge of said second member (21) in an abutting relationship defining a geometry to be weld-brazed (3),
(iii) heating the surface areas of said members adjacent the abutment to a temperature above the melting temperature of said aluminum alloy and below the melting temperature of said titanium alloy, in the presence of an inert gas (5) and of a filler metal (4) to obtain a weld-brazed joint.

The process of the invention is particularly useful for obtaining high strength weld-brazed joints between aluminum and titanium with a high process output.

20 Claims, 9 Drawing Sheets

U.S. PATENT DOCUMENTS

| | | | |
|---|---|---|---|
| 3,442,009 A * | 5/1969 | Shellman et al. | 228/160 |
| 3,779,446 A * | 12/1973 | Lemelson | 228/15.1 |
| 3,837,066 A * | 9/1974 | Mori et al. | 29/599 |
| 4,221,611 A * | 9/1980 | Nagano et al. | 148/26 |
| 4,273,983 A * | 6/1981 | Ogawa et al. | 219/93 |
| 4,486,647 A | 12/1984 | Kuusinen et al. | |
| 6,051,325 A * | 4/2000 | Talwar et al. | 428/593 |
| 2002/0020733 A1 * | 2/2002 | Hirose et al. | 228/114.5 |
| 2002/0061417 A1 * | 5/2002 | Shindo et al. | 428/650 |
| 2004/0045943 A1 * | 3/2004 | Yabu | 219/121.64 |
| 2004/0079634 A1 * | 4/2004 | Wickersham et al. | 204/298.12 |
| 2005/0051606 A1 * | 3/2005 | Perrot et al. | 228/193 |
| 2005/0156095 A1 | 7/2005 | Vichniakov | |
| 2005/0258218 A1 * | 11/2005 | Schmaranzer et al. | 228/262.5 |
| 2006/0163321 A1 * | 7/2006 | Hasegawa et al. | 228/101 |
| 2006/0213953 A1 * | 9/2006 | Slattery | 228/112.1 |
| 2007/0283549 A1 * | 12/2007 | Twigg | 29/428 |
| 2008/0057341 A1 * | 3/2008 | Bouillot et al. | 428/685 |
| 2009/0145886 A1 | 6/2009 | Kocik et al. | |
| 2009/0314823 A1 * | 12/2009 | Bray | 228/112.1 |

FOREIGN PATENT DOCUMENTS

JP        2003-53557 A   *   2/2003

OTHER PUBLICATIONS

Schumacher et al., "Investigation of Laser-Beam Joined Titanium-Aluminum Hybrid Structures", Applied Production Technology APT07, Bremen, Sep. 17-19, 2007.

Kreimer et al., "Laser Processing of Aluminum-titanium-tailored blanks", Optics and Lasers in Engineering 43 (2005) 1021-1035.

Wilden et al., "Properties of Diffusion welded hybrid joints titanium/aluminum", Proceedings of the 3rd International Brazing and Soldering Conference, Apr. 24-26, 2006, Crowne Plaza Riverwalk Hotel, San Antonio, Texas, USA, pp. 338-343.

* cited by examiner (a)

(b)

Figure 7
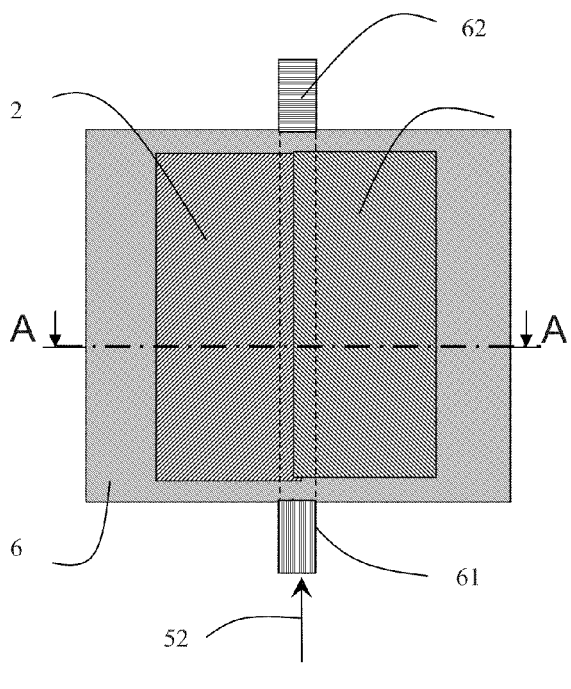
Figure 7(a)
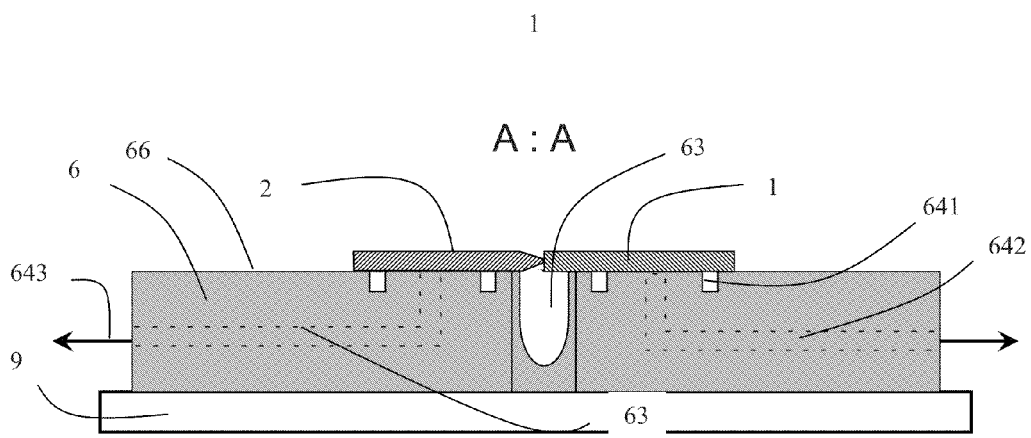
Figure 7(b)

(a)

(b)

FUSION WELDING PROCESS TO JOIN ALUMINUM AND TITANIUM

CROSS REFERENCE TO RELATED APPLICATIONS

This application claims priority from European Application no 08356105.0 filed on Jul. 7, 2008, as well as U.S. Provisional Application Ser. No. 61/078,614 filed Jul. 7, 2008, the contents of both of which are incorporated herein by reference in their entireties.

BACKGROUND OF THE INVENTION

1. Field of the Invention

The present invention relates generally to a joining process of aluminum alloys to titanium alloys, and in particular, to such process useful in the aerospace industry.

2. Description of Related Art

It is generally known that when manufacturing semi-finished products and structural elements for aeronautical construction, certain required properties generally cannot be optimized at the same time independently of one another. The monolithic metallic structural elements with variable properties in space are thus very much in demand in the existing context in the aeronautical industry. Structural elements are subjected to a wide variety of contradictory constraints that require particular choices about materials and working conditions that can lead to unsatisfactory compromises.

U.S. published application Ser. No. US 2005/156095 explains that for manufacturing seat mounting rails of aircraft, it is advantageous to use a material highly resistant to corrosion such as titanium alloys. However, titanium alloys are more expensive and have a higher density than aluminum alloys, which is not advantageous with regard to the constant need for cost and weight reductions in the manufacture of commercial aircrafts. It is proposed to make a seat mounting rail with a lower section made of a first material, such as high strength aluminum alloy and an upper section made of a second material different from the first material, such as a titanium alloy. The first and second materials are interconnected by a homogeneous metallurgical interconnection or bonding.

Among welding techniques, two main families may be distinguished. In fusion welding processes, such as resistance spot welding, flash butt welding, laser welding, arc welding electron-beam welding, the weld is made above the melting point, in the liquid phase. In solid state welding such as friction welding, friction stir welding, or diffusion welding, the weld is made below the melting point, in the solid phase.

Diffusion welding of titanium and aluminum has been reported in "Properties of diffusion welded hybrid joints titanium/aluminum, J. Wilden, J P Bergmann, S. Herz, Proceedings of the 3$^{rd}$ International Brazing and Soldering Conference, Apr. 24-26, 2006, Crowne Plaza Riverwalk Hotel, San Antonio, Tex., USA, pp 338-343)". However, the strength of the assembly obtained is lower than 100 MPa.

Regarding fusion welding techniques, two options may be considered in order to weld an aluminum alloy to a titanium alloy: a first option is to weld at a temperature above the melting temperature of the titanium alloy in order to have fusion of both the aluminum and the titanium alloys and a second option is to weld at a temperature above the melting temperature of the aluminum alloy but below the melting temperature of the titanium alloy, this later case will be referred to herein as "weld-brazing".

U.S. Pat. No. 4,486,647 illustrates the first option: enough welding energy is provided in order to melt the aluminum and the titanium alloys at the melt boundary. However, when the melt solidifies, titanium-aluminum compounds are produced in large quantities, resulting in a poor mechanical strength of the joint, lower than about 100 MPa.

The first option has also been reported in "Laser processing of aluminum-titanium tailored blanks, M. Kreimeyer, F. Wagner, F. Vollersten, Optics and Lasers in Engineering 43 (2005) 1021-1035". In this article, a process is reported wherein the joining is achieved by melting the titanium base metal whilst heating the aluminum base metal through conduction. However, it appears again that a limited strength, around 200 MPa in this case, is obtained.

U.S. Pat. No. 2,761,047 provides weld brazing conditions in order to join aluminum and aluminum alloys to titanium and titanium alloys with an inert gaseous arc torch. The process disclosed comprises a cleaning step which is said to be best accomplished when the torch has a non consumable electrode and is of the ultra-high frequency alternating current type.

Laser weld brazing of aluminum and titanium without filler metal is also reported in "Investigation of Laser-Beam Joined Titanium-Aluminum Hybrid Structures, Applied Production Technology APT'07, Bremen, Sep. 17-19, 2007". Mechanical strength is improved compared to the first option, however it is still not higher than 242 MPa for a weld between a TiAl6V4 alloy and a 6056 alloy in the T4 condition, aged after welding to the T6 condition. The reported joining speed at the conference was around 0.2 m/mn and leads to a wide heat affected zone of around 20 mm.

Weld-brazing aluminum to titanium has proven difficult, the strength of the joint may be increased and the process output improved. There is a need for an improved method capable of weld-brazing aluminum alloy parts to titanium alloy parts, with a high output capable of providing high strength welding joints.

SUMMARY OF THE INVENTION

A first object of the invention was providing a process for joining a first member (1) comprising an aluminum alloy to a second member (2) comprising a titanium alloy and having at least one edge with a thickness e, comprising the steps of
(i) chamfering said edge of said second member into a tapered truncated shape having on a first side a first tapering angle $\alpha 1$, on a second side a second tapering angle $\alpha 2$ and a minimum thickness t, wherein $\alpha 1$ and $\alpha 2$ are greater than or equal to zero, the sum of $\alpha 1$ and $\alpha 2$ is from 10° to 50° and t is from 0.05 e to 0.3 e,
(ii) placing said first member and said chamfered edge of said second member (21) in an abutting relationship defining a geometry to be weld-brazed (3),
(iii) heating the surface areas of said members adjacent the abutment to a temperature above the melting temperature of said aluminum alloy and below the melting temperature of said titanium alloy, in the presence of an inert gas (5) and of a filler metal (4) to obtain a weld-brazed joint.

Note that the reference numerals set forth above are not intended as limiting and are merely exemplary.

Another object of the invention was the provision of a weld-brazed assembly, advantageously obtainable according to the process of the invention comprising a first extruded member (1) comprising a fusion weldable alloy from 2XXX, 6XXX or 7XXX alloy families and a second extruded member (2) comprising a titanium alloy and having at least one edge with a thickness e and a tapered truncated shape having on a first side a first tapering angle α1, on a second side a second tapering angle α2 and a minimum thickness t, wherein α1 and α2 are greater than or equal to zero, the sum of α1 and α2 is between 10° and 50° and t is between 0.05 e and 0.3 e.

Other objects of the invention include the use of a weld-brazed assembly of the present invention for the fabrication of structural elements for the aerospace industry and aircraft seat tracks comprising a weld-brazed assembly according to the present invention.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims

BRIEF DESCRIPTION OF THE DRAWINGS

FIG. 7 shows a clamping device according to the invention

DETAILED DESCRIPTION OF A PREFERRED EMBODIMENT

Unless otherwise indicated, all the indications relating to the chemical composition of the alloys are expressed as a mass percentage by weight based on the total weight of the alloy. Alloy designation is in accordance with the regulations of The Aluminum Association, known to those skilled in the art. A designation 6X56 includes any alloy having 6 as a first digit and 56 as third and fourth digits, such as for example 6056 and 6156. Titanium alloys are designated herein by using the chemical symbol for titanium, Ti, followed by the percentage number(s) and the chemical symbols(s) of the alloying element(s). For example, Ti-5Al-2.5Sn indicates that 5 weight percent aluminum and 2.5 percent tin alloying elements are present in the titanium alloy. The tempers of aluminum alloy products are laid down in European standard EN 515, which is incorporated herein by reference. Within the present description, T3X means any temper having 3 as a first digit, including for example T3, T39, T351 or T351 1, mutatis mutandis for T4X, T6X and T8X. Unless otherwise indicated, the static mechanical characteristics, in other words the ultimate tensile strength (UTS, also designated as Rm), the tensile yield strength (TYS, also designated as YS or Rp0.2), the elongation at fracture A and the elongation at necking Ag, are determined by a tensile test according to standard EN 10002-1, which is incorporated herein by reference. Tensile tests on weld-brazed joints are determined according to EN 895: "Destructive tests on welds in metallic materials—Transverse tensile test" which is incorporated herein by reference. Unless otherwise indicated, the definitions given in the European Standard EN 12258-1, incorporated herein by reference, apply.

Figure 1:
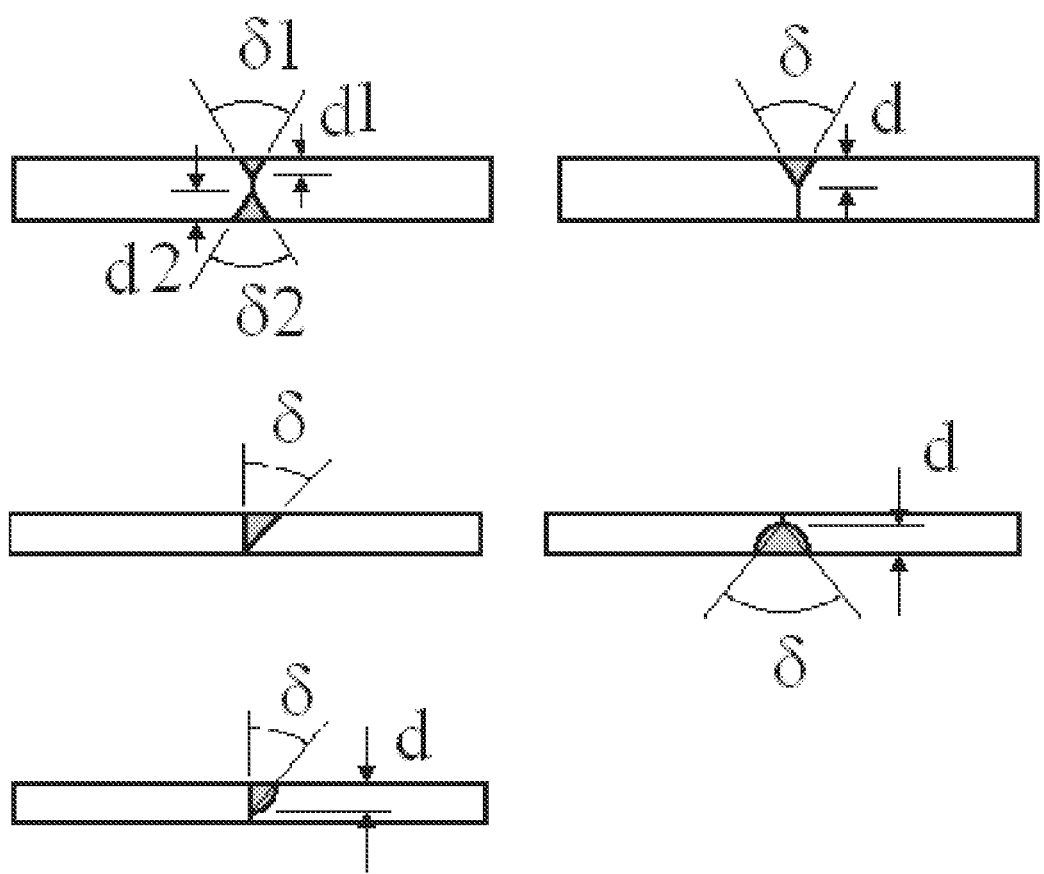
FIG. 1 shows grooves defined by the various joint geometries and characterized by an angle δ and a depth d.

The term "sheet" means a rolled product not exceeding about 6 mm in thickness. The term "plate" includes "medium plate" which is a rolled product from about 6 mm to about 30 mm in thickness, and "thick plate" which is a rolled product typically above about 30 mm in thickness. Joint geometries defined for welded joints in standard ISO 2553:1992(E), incorporated herein by reference, are used herein to describe the preparation of edges to be welded or brazed. Grooves defined by the various joint geometries are characterized by an angle 6 and a depth d, as illustrated in FIG. 1. Thicknesses of extruded products are defined according to standard EN2066 which is incorporated herein by reference.

According to the present invention, the process for joining a first member (1) comprising an aluminum alloy to a second member (2) comprising a titanium alloy and having at least one edge with a thickness e, advantageously comprises the steps of (i) chamfering said edge of said second member into a tapered truncated shape having on a first side a first tapering angle α1 between the bevelled portion and the surface of said first side, on a second side a second tapering angle α2 1 between the bevelled portion and the surface of said second side and a minimum thickness t wherein the sum of α1 and α2 is between 10° and 50° and t is between 0.05 e and 0.3 e, (ii) placing said first member and said chamfered edge of said second member (21) in an abutting relationship defining a geometry to be weld-brazed (3), (iii) heating the surface of said members to a temperature above the melting temperature of said aluminum alloy and below the melting temperature of said titanium alloy, in the presence of an inert gas (5) and of a filler metal (4) to obtain a weld-brazed joint. α1 and α2 are greater than or equal to zero.

Figure 2:
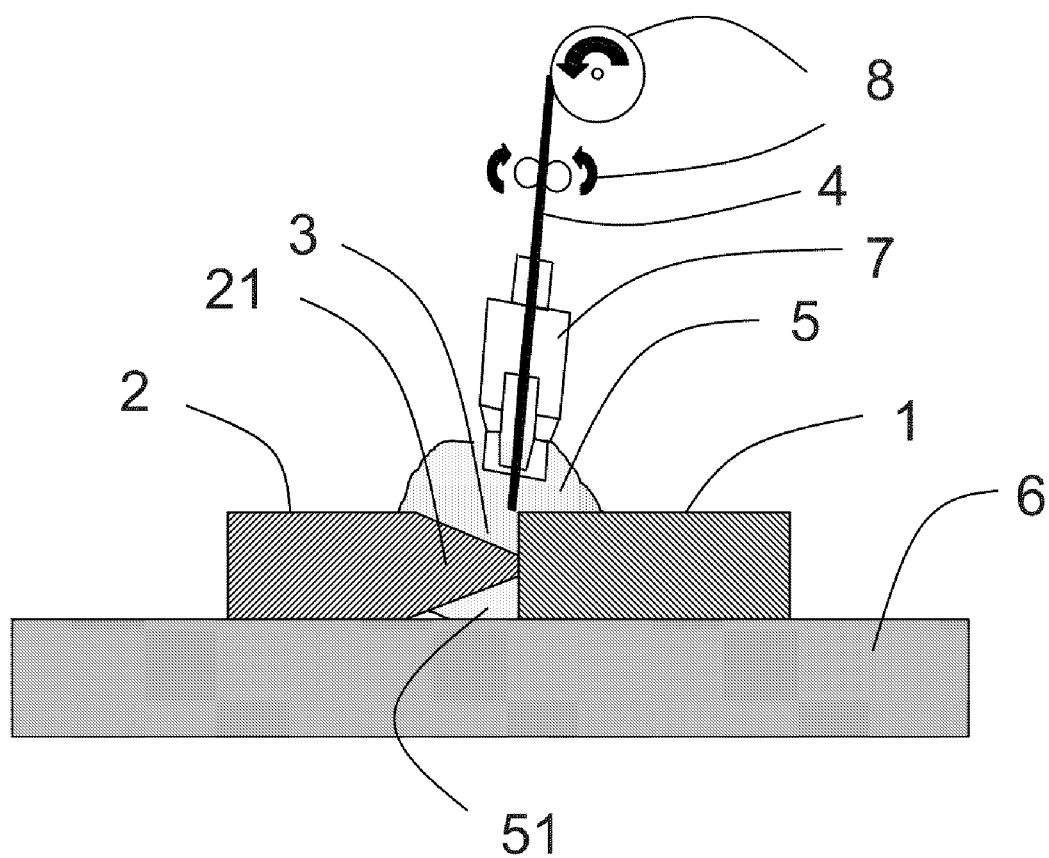
FIG. 2 shows an embodiment of the invention.

FIG. 2 shows an embodiment of the present invention wherein a first member (1) comprising an aluminum alloy is placed in an abutting relationship with a second member (2) having one edge chamfered into a tapered truncated shape (21). The first and second members are preferably secured with a schematically represented clamping device (6). In this embodiment, the geometry of the abutting relationship (3) is a double-bevel butt with broad root face. A MIG torch (7) having a consumable filler wire (4) can be employed as an electrode emits an inert gas which envelops the area of joining and provides the atmosphere (5) of inert gas, preventing oxidation of the surface areas adjacent to the abutting parts of the first and second members. The back portion of the weld (i.e, the portion of the weld located on the side opposite to the MIG torch) is also protected of oxidation by the inert gas (51). Means for providing the consumable electrode (8) are also advantageously present in this embodiment. The surface of the members is preferably heated to a temperature above the melting temperature of the aluminum alloy and below the melting temperature of the titanium alloy to obtain a weld-brazed joint.

Figure 3:
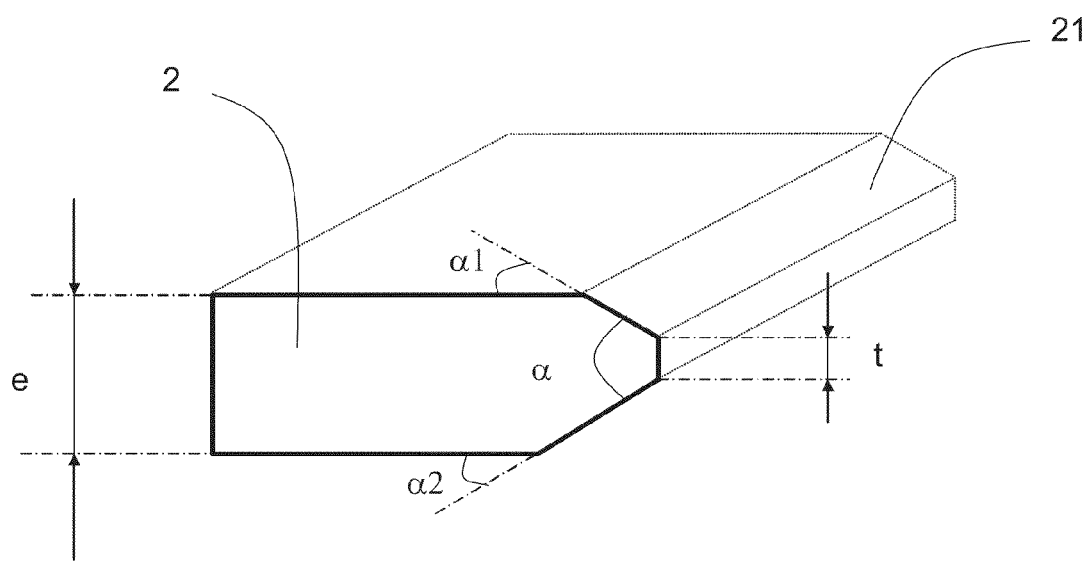
FIG. 3 is an example of a specific shape of the chamfered edge according to the invention.
Figure 4:
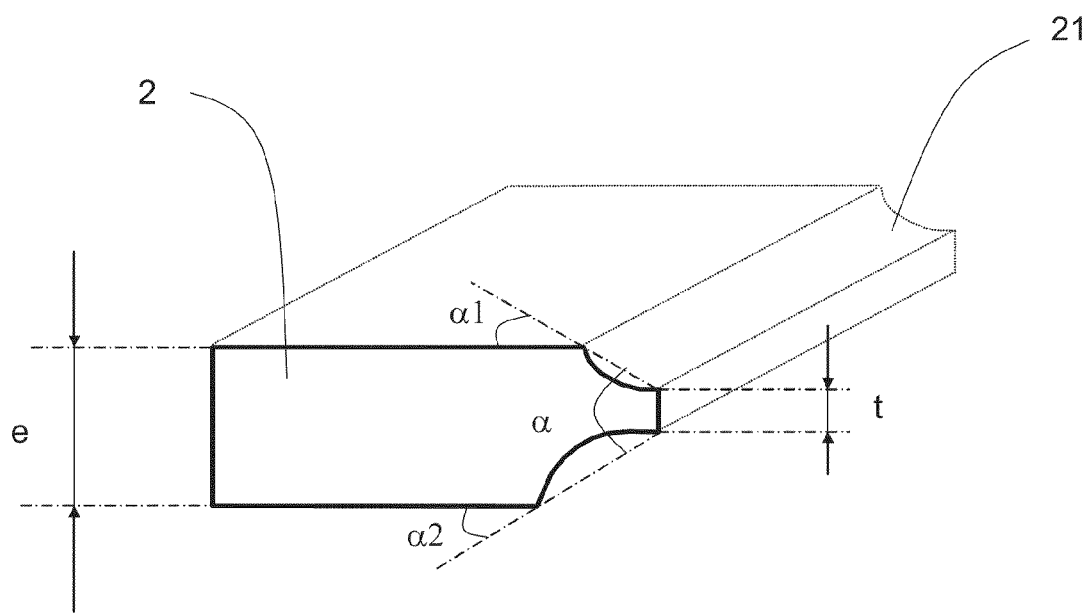
FIG. 4 is an example of a specific shape of the chamfered edge according to the invention.

According to the present invention, the chamfered edge of the second member comprising a titanium alloy advantageously has a specific shape. FIG. 3 and FIG. 4 are two examples of specific shapes of the chamfered edge according to the present invention. The second member has at least one edge with a thickness "e". Typically, the second member is an extruded profile or a sheet, although any edge with a plane-parallel shape can be used if desired. Preferably, the first and second members are at least one of an extruded profile, a sheet and/or a plate. As shown for example by FIGS. 3 and 4, the edge with a plane-parallel shape of thickness e preferably has on a first side thereof, a first tapering angle $\alpha 1$ between the bevelled portion and the surface said first side, on a second side thereof, a second tapering angle $\alpha 2$ between the bevelled portion and the surface said second side, and a minimum thickness t. The sum of $\alpha 1$ and $\alpha 2$ is preferably between 10° and 50° and t is between 0.05 e and 0.3 e. The tapered truncated shape of the invention typically provides a significant strength improvement of the welded joint as well as typically provides improved process output. If the sum of $\alpha 1$ and $\alpha 2$ is less than about 10°, the tapered shape may be too sharp compared to the edge thickness and the tapered face may not be entirely covered by the weld, which may cause loss of strength of the welded joint. If the sum of $\alpha 1$ and $\alpha 2$ is more than about 50°, the tapered shape may not be sharp enough compared to a regular square butt geometry, and may not provide a significant strength improvement. If t is lower than about 0.05 e, the truncated shape tip may be too sharp and may melt during weld-brazing, which should be avoided in most cases. If t is higher than about 0.3 e, the truncated shape tip may not be sharp enough compared to regular square butt geometry, and may not provide a significant strength improvement. Preferably the sum $\alpha 1+\alpha 2$ is from 20° to 40° and/or t is from 0.1 e to 0.2 e.

Although the present inventors are not bound to any specific theory, it is believed that the improved strength of the weld-brazed joint according to the present invention is related to the increase of contact surface between aluminum and titanium alloys and/or to the improved flow of the melted alloy aluminum on the titanium alloy surface and/or to the absence of sharp contact angles between aluminum and titanium alloys, in relation to the tapered truncated shape. The tapered truncated shape is selected even for an edge thickness of less than 2.5 mm, which is contrary to the usual purpose of chamfered edges, which is to reduce the thickness of the weld-brazing area.

The first member and the chamfered edge of said second member (21) are then preferably placed in an abutting relationship defining a geometry to be weld-brazed. The abutting relationship advantageously comprises geometries wherein a limited joint spacing is left between the members to be weld brazed, typically less than 10% of the second member edge thickness e. Preferably, the geometry is at least one of a bevel butt with broad root face, a V butt with broad root face, a J-butt, a U-butt and combination thereof. By combination it is meant that, for example, a V butt with broad root face may be selected on one side whereas a bevel butt with broad root face is selected on the other side, providing a V-bevel butt with broad root face geometry.

Figure 5:
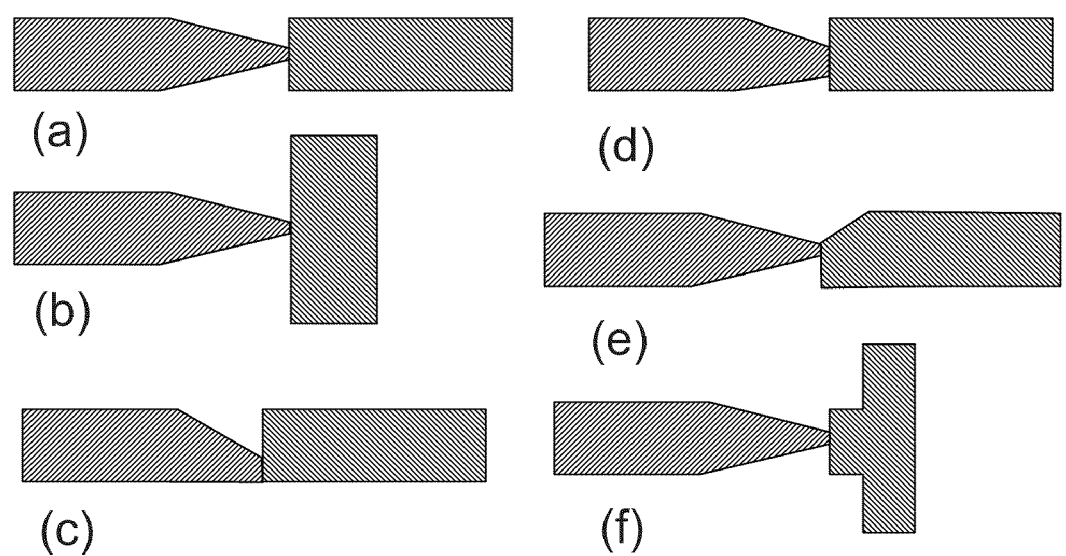
FIG. 5 shows various abutting relationships of first and second members according to the invention.

In an embodiment of the invention, the geometry is a single-bevel butt with broad root face having an angle $\delta$ and a depth d, said angle $\delta$ being between 40° and 80° and preferably between 50° and 70°, and said depth d being between 70% and 95% and preferably between 80% and 90% of said second member thickness. This embodiment is illustrated, for example, by FIG. 5c.

In a preferred embodiment of the invention, the geometry is a double-bevel butt with broad root face having a first groove on one side with a first angle $\delta 1$ and a first depth d1 and a second groove on the other side with a second angle $\delta 2$ and a second depth d2 and wherein said first and second angle $\delta 1$ and $\delta 2$ are between 40° and 80° and preferably between 50° and 70°, and wherein the sum of said first depth d1 and said second depth d2 is between 70% and 95% and preferably between 80% and 90% of said second member thickness. This embodiment is illustrated for example, by FIGS. 5a, 5b, 5d and 5f.

In another embodiment of the invention, the geometry is a single-V butt with broad root face having an angle $\delta$ and a depth d and wherein said angle $\delta$ is between 100° and 140° and preferably between 110° and 130°, and wherein said depth d is between 70% and 95% and preferably between 80% and 90% of said second member thickness.

In yet another embodiment of the invention, the geometry is a V-bevel butt with broad root face having a first V groove on one side with a first angle $\delta 1$ and a first depth d1 and a second bevel groove on the other side with a second angle $\delta 2$ and a second depth d2, wherein said first angle $\delta$ is between 100° and 140° and preferably between 110° and 130°, wherein said second angle $\delta 2$ is between 40° and 80° and preferably between 50° and 70°, and wherein the sum of said first depth and said second depth is between 70% and 95% and preferably between 80% and 90% of said second member thickness. This embodiment is illustrated for example, by FIG. 5e. V butt with broad root shape geometries on at least one side are advantageous, for example, when the aluminum alloy first member is too thick to be melted throughout its entire thickness in usual fusion welding conditions. That is, typically this embodiment may be of use when the thickness of the first member is higher than about 2.5 mm or even 5 mm.

Figure 6:
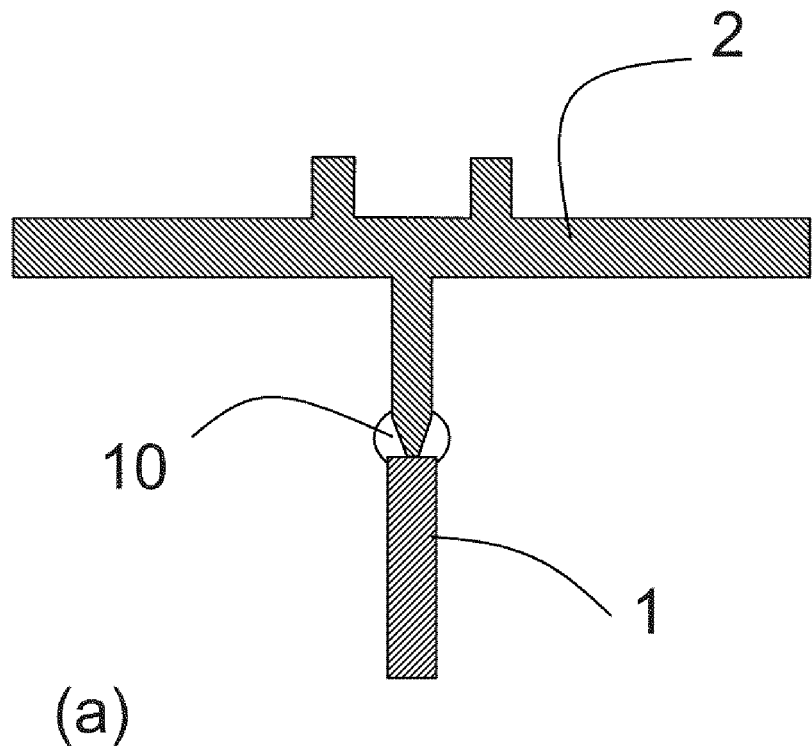
FIG. 6 shows two embodiments of extruded section weld-brazed according to the invention.
Figure 6:
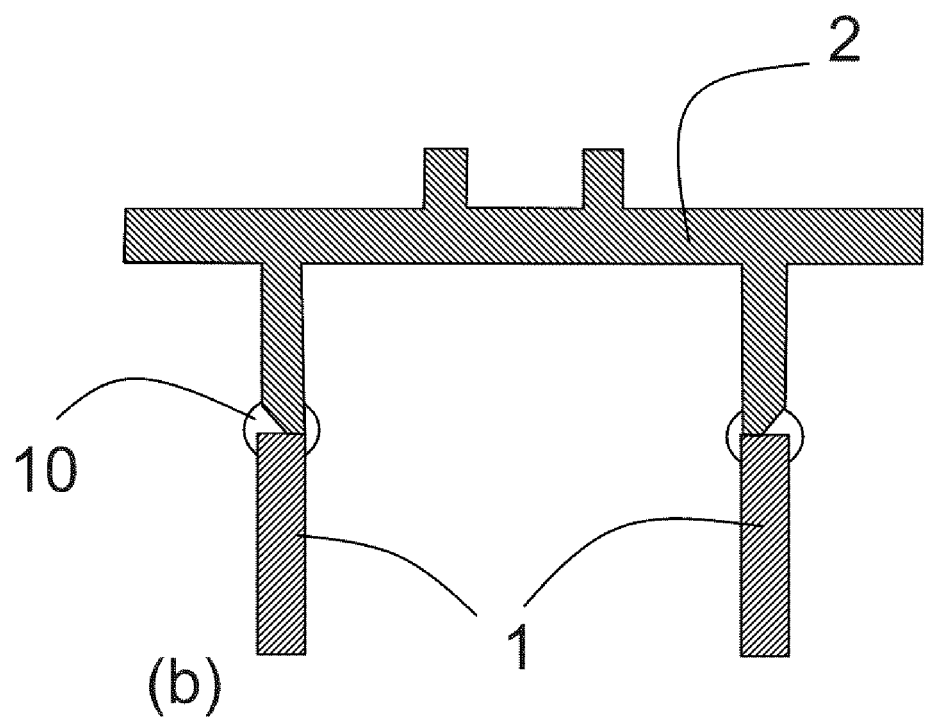

FIGS. 6a and 6b illustrate suitable weld brazed assemblies between extruded profile sections made of a titanium alloy (2) and of an aluminum alloy (1) joined by a weld-braze joint (10) according to the invention.

When the weld-brazed assembly includes several aluminum alloys members as illustrated in FIG. 6b, an unsymmetrical joint geometry such as for example single-bevel geometry (FIG. 5c) or unsymmetrical double bevel geometry (FIG. 5d) or single V geometry, may be advantageous. On the other hand, symmetrical geometries such as for example double bevel geometry or double V geometry can be advantageous for weld brazed assemblies including a single aluminum alloy member such as illustrated in FIG. 6a.

The surface areas of said members adjacent the abutment are then preferably heated to a temperature above the melting temperature of said aluminum alloy and below the melting temperature of said titanium alloy, in the presence of an inert gas (5) and of a filler metal (4) to obtain a weld-brazed joint. This operation is herein referred to as the weld-brazing step.

Fusion welding processes, such as resistance spot welding, flash butt welding, laser welding, arc welding such as TIG (Tungsten Inert Gas) or MIG (Metal Inert Gas), plasma welding, electron-beam welding and combinations thereof are preferred methods used for heating the surfaces of said members. In a preferred embodiment of the invention, an arc welding process with a consumable electrode is used. An advantage of the consumable electrode over the non-consumable electrode is, in particular a reduced heat input which reduces the width if the heat affected zone and an easier process automation which enables a higher process output. According to the inventive process, use of a filler metal can be highly advantageous to order to avoid hot cracks in the weld. Various filler metals made of aluminum alloys or zinc alloys are suitable for the present invention, the filler metal is usually selected to be compatible with the first member aluminum alloy. Examples of filler alloys include: 2319, 4043, 4047, 4145, 5087 and 5183. Examples of inert gases suitable for the instant process include argon, helium, nitrogen and mixtures thereof. An oxidizing gas such as oxygen or carbon-dioxide may be added to the inert gas if desired for any reason. A suitable mixture is one that preferably contains at least 95% of argon or helium and up to 5% of oxygen or carbon dioxide.

Any fusion weldable aluminum alloy can be of use for the process of the present invention. In particular, fusion weldable alloys of the 2XXX, 5XXX, 6XXX and 7XXX series are advantageous. Preferably the aluminum alloy first member is a heat treatable alloy, which means that it can be hardened by solution heat treatment and quenching. Among heat treatable aluminum alloys, 6XXX alloys or 2XXX alloys having at least 0.8 wt. % lithium are preferred. Weldable aluminum-lithium alloys having at least 0.8 wt. % lithium and further containing at least 0.1 wt. % silver ("Weldalite® alloys") are particularly suitable for the process of the present invention.

For artificially aged aluminum alloy products, the weld-brazing operation may be carried out before or after artificial aging. Strength is further improved when artificial aging is carried on the weld brazed assembly. In an embodiment of the present invention said first member is in a T3X or T4X temper during the weld-brazing step and the process comprises a step following the weld-brazing step consisting of aging the first member to a T6X or T8X temper. However, this additional process step may not be advantageous for the process output in some instances, in particular when the assembly has large dimensions, such as length of several meters. A weld-brazed assembly according to the invention is advantageously obtainable according a process of the invention and preferably comprises a first member (1) comprising a fusion weldable alloy from 2XXX, 5XXX, 6XXX or 7XXX alloy families and a second member (2) comprising a titanium alloy and having at least one edge with a thickness e and a tapered truncated shape having on a first side a first tapering angle α1 between the bevelled portion and the surface of said first side, on a second side a second tapering angle α2 between the bevelled portion and the surface of said second side and a minimum thickness t, wherein α1 and α2 are greater than or equal to zero, the sum of α1 and α2 is between 10° and 50° and t is between 0.05 e and 0.3 e. Weld brazed alloys that have the stated characteristics but made according to other processes are also envisioned as being part of the present invention.

A weld-brazed assembly according to the present invention preferentially has an ultimate tensile strength higher than 260 MPa, and preferably higher than 280 MPa. A weld-brazed assembly according the invention can be used, for example, for the fabrication of structural elements for the aerospace industry. For example, an aircraft seat track comprising a weld-brazed assembly according to the present invention is advantageous.

Another improvement related to the instant process is a reduction of the width of the heat affected zone, which is can typically be less than about 15 mm or even less than about 10 mm.

The process according to the present invention typically enables the use of high welding speed of preferably at least 0.5 m/min and even at least 1.0 m/min.

Usually, the finished weld brazed assembly can be obtained after two welding runs one on each side of the abutting members, which reduces the process output. The present inventors found that with a specific clamping device, it is often possible to obtain a finished weld brazed assembly with a single welding run, which is highly advantageous for process output. Weld-brazing on one side is also advantageous when one side has low accessibility, such as in the geometry of FIG. 6b. According to an advantageous embodiment of the present invention, the first and second members can be fixed with a clamping device comprising a means for maintaining a back pressure of inert gas above atmospheric pressure, preferably higher than 110 kPa or 120 kPa and it is then possible to obtain a finished weld-brazed assembly after a single welding run. The back pressure of inert gas is the pressure of inert gas around the back portion of the weld. Unexpectedly, the pressure control obtained with the clamping device according to the present invention enables control of the aluminum alloy melt flow and in particular to force the aluminum alloy melt onto the titanium alloy member, avoiding for example drop falling or excessive weld collar, during weld-brazing and obtaining a substantially symmetrical weld brazed joint after a welding run on a single face, irrespective of the groove geometry.

A suitable clamping device for the process of the invention with means to control the inert gas back pressure is now described (FIG. 7). Other options are also possible and this is but one embodiment described below. The clamping device (6) useful for weld-brazing a first member comprising an aluminum alloy (1) to a second member comprising a titanium alloy (2), comprises an upper face (66) adapted to press against said members to be weld-brazed together, a channel (63), means (641), (642), (643) for tightening said members onto said upper face in order to obtain a substantially leak free pipe having said channel and members for walls, means (61) for introducing a gas (52) into said pipe and means (62) for obtaining a pressure of said gas in said pipe above atmospheric pressure so that said pressure forces the aluminum alloy melt onto said second member during weld-brazing. The means for tightening the member (1) and (2) onto the upper surface (66) are preferably channels (641) linked to a vacuum pump (643) through machined tubes (642). Mechanical clamping may also be used but it appeared to the present inventors that it is more difficult with this type of tightening means to obtain a substantially leak-free pipe between the channel and the members to be welded. By substantially leak free it is meant that it is possible to obtain a pressure within the pipe above atmospheric pressure without excessive inert gas input pressure. A diffuser may be used advantageously as a means for obtaining over pressure.

The process according to the invention finds many uses, in particular in the mechanical construction of transportation vehicles in the car, railway, aerospace, shipbuilding industries. Fabrication of structural elements for the aerospace industry is a preferred application. The term "structural element" refers to an element used in a mechanical construction for which the static and/or dynamic mechanical characteristics are particularly important for performance and integrity of the structure, and for which a structural calculation is usually required or performed. It is typically a mechanical part, which if it fails will endanger the safety of the said construction, its users, passengers or others. For an aircraft, these structural elements include particularly elements making up the fuselage, such as the fuselage skin, stiffeners or stringers, bulkheads, circumferential frames, wings (such as the wing skin), stiffeners, ribs and spars, and the tail fin composed particularly of horizontal or vertical stabilisers, and floor beams, seat tracks and doors.

Extruded profiles weld brazed with a process according to the invention are particularly useful to make aircraft seat tracks.

EXAMPLES

Welded assemblies were prepared comprising 1.8 or 2 mm thick sheets made of an aluminum alloy and of a titanium alloy having the same thickness. The titanium alloy was Ti-6Al-4V. The aluminum alloy was either AA6X56 or AA2X98. AA6X56 was welded either in the T3X temper or in the T6X temper. When AA6X56 was welded in the T3X temper, the welded assembly was aged in order to obtain a T6X temper after welding. AA2X98 was welded either in the T3X temper or in the T8X temper. When AA2X98 was aged in the T3X temper, the welded assembly was aged in order to obtain a T8X temper after welding This process is referred to as PWHT (Post Welding Heat Treatment) whereas process wherein welding is carried out on an aged aluminum alloy member are referred to as HTBW (Heat treatment Before Welding).

MIG arc welding was used as a welding method. The trials were conducted with a CMT® welding machine from Fronius. Argon was used as an inert gas for welding. The filler metal was a 4043 alloy wire with a diameter of 1.2 mm. Unless otherwise mentioned the titanium sheet was chamfered with the geometry $\alpha 1=\alpha 2=15°$ and t/e=0.15 ($\alpha 1$, $\alpha 2$, t and e as defined in FIG. 3). Unless otherwise mentioned the aluminum sheet and the chamfered edge of the titanium sheet were placed in an abutting relationship defining a double bevel butt with broad face geometry. Two clamping devices were used. Clamping device A is a standard clamping device described in FIG. 2 and clamping device B is described in FIG. 7. When clamping device B was used, weld-brazing was carried out only on one side of the abutting members. When clamping device A was used, welding was carried out on one side, then the welded assembly was turned upside down and welding was carried out in the other side. The trial conditions and mechanical properties of the welded joints are provided in Table 1.

TABLE 1

Trials conditions and results.

| Trial number | Aluminum alloy | HTBW | PWHT | Clamping device | Welding speed [m/min] | TYS [MPa] (average values)[b] | UTS [MPa] (average values)[b] |
|---|---|---|---|---|---|---|---|
| 1 | 6X56 | | x | A | 1.0 | 224 | 271 |
| 2 | 6X56 | x | | A | 1.0 | 178 | 257 |
| 3 | 2X98 | x | | B | 1.0 | | 337 |
| 4 | 6X56 | x | | B | 1.0 | | 257 |
| 5[a] Reference | 6X56 | x | | B | 0.6 | | 157-226 |

[a]no chamfering of the titanium sheet, square butt geometry before weld-brazing
[b]Standard deviation of variants 1-4, 6 and 7 is <10 MPa. For trial n° 5 the deviation between the trials was too large (>27 MPa) to provide a significant average value, maximum and minimum values are indicated.

Images of the weld-brazed sample from trial number 1 (two welding run) and from trial number 4 (single welding run) are presented in FIGS. 7a and 7b, respectively.

Figure 8:
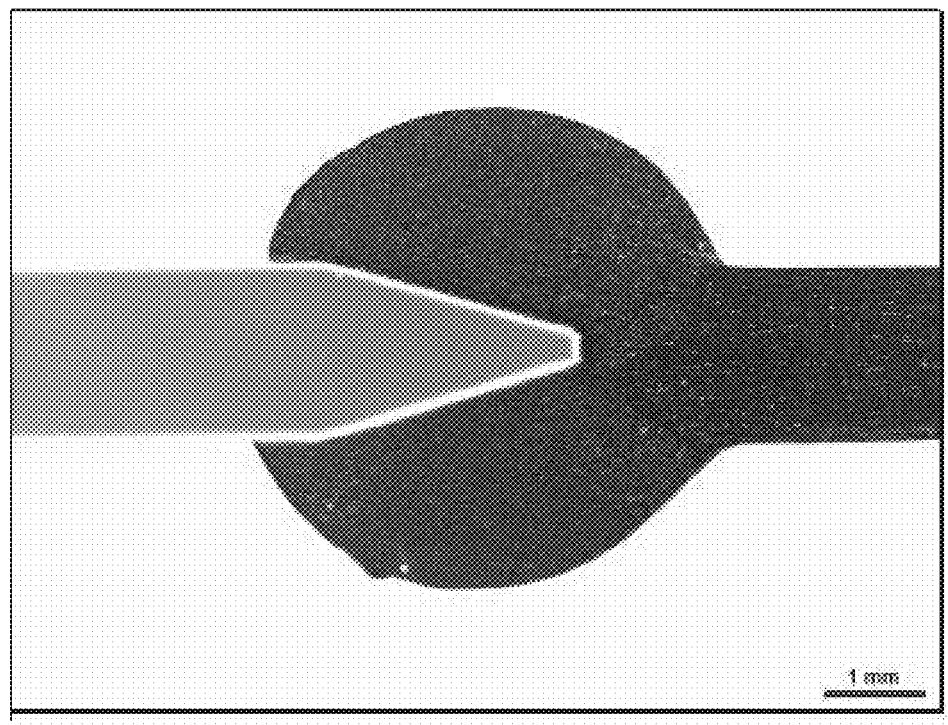
FIG. 8a and 8b show images of weld-brazed joints for trials number 1 and 4, respectively.
Figure 8:
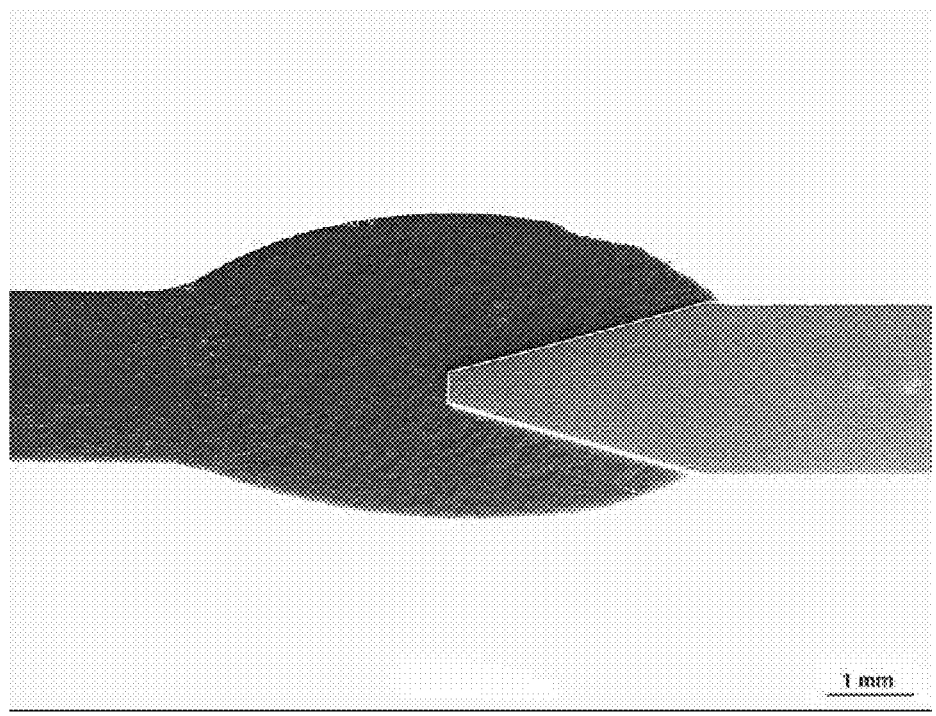
Figure 9:
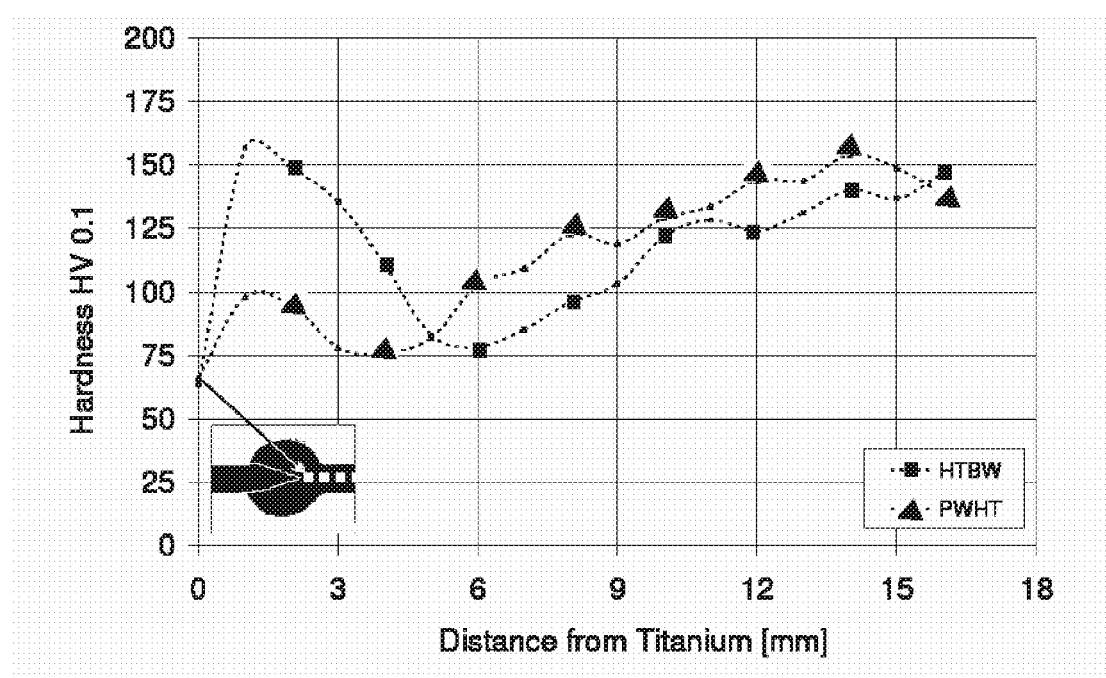
FIG. 9 shows a hardness profile for trial number 1 and 2.

FIG. 8 is a hardness profile for weld-brazed samples from trial number 2 (HTBW) and from trial number 1 (PWHT). The hardness profile is useful to determine the width of the heat affected zone. For both samples, the width of the heat affected zone is around 10 mm, lower than 15 mm.

The comparison of reference trial number 5 with trial according to the invention (1 to 4, 6 and 7) clearly shows the advantage of the process according to the invention: the strength of weld-brazed samples according to the invention is higher and also exhibits less deviation compared to reference weld brazed samples. The further improvement related to the post welding heat treatment process is observed in particular by comparing trial number 1 to trial number 2. Strength obtained with a single welding run (clamping device B) are similar than those obtained with two welding runs (clamping device A), the process output is thus doubled with clamping device B.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As used herein and in the following claims, articles such as "the", "a" and "an" can connote the singular or plural.

All documents referred to herein are specifically incorporated herein by reference in their entireties.

The invention claimed is:

1. A process for joining a first member comprising an aluminum alloy to a second member comprising a titanium alloy and said second member having at least one edge with a thickness e, said process comprising:
   (i) chamfering said edge of said second member into a tapered truncated shape having on a first side thereof, a first tapering angle $\alpha 1$, and having on a second side thereof, a second tapering angle $\alpha 2$ and a minimum thickness t,
   wherein $\alpha 1$ and $\alpha 2$ are greater than or equal to zero, the sum of $\alpha 1$ and $\alpha 2$ is from 10° to 50° and t is from 0.05 e to 0.3 e,
   (ii) placing said first member and said chamfered edge of said second member in abutment to define a geometry capable of being weld-brazed,
   (iii) heating surface areas of said members adjacent the abutment to a temperature above the melting temperature of said aluminum alloy and below the melting temperature of said titanium alloy, in the presence of an inert gas and in the presence of a filler metal so as to obtain a weld-brazed joint.

2. A process according to claim 1 wherein the sum $\alpha 1+\alpha 2$ is from 20° to 40° and/or t is from 0.1 e to 0.2 e.

3. A process according to claim 1 wherein said geometry is at least one selected from the group consisting of a bevel butt with broad root face, a V butt with broad root face, a J-butt, and a U-butt.

4. A process according to claim 3 wherein said geometry is a single-bevel butt with broad root face having an angle δ and a depth d, wherein said angle δ is from 40° to 80°, and said depth d is from 70% to 95% of said second member thickness.

5. A process according to claim 3 wherein said geometry is a double-bevel butt with broad root face having a first groove on one side thereof with a first angle δ1 and a first depth d1 and a second groove on another side thereof with a second angle δ2 and a second depth d2, and wherein said first and second angle δ1 and δ2 are from 40° to 80°, and wherein the sum of said first depth d1 and said second depth d2 is from 70% to 95% of said second member thickness.

6. A process according to claim 3, wherein said geometry is a single-V butt with broad root face having an angle δ and a depth d and wherein said angle δ is from 100° to 140°, and wherein said depth d is from 70% to 95% of said second member thickness.

7. A process according to claim 3, wherein said geometry is a V-bevel butt with broad root face having a first V groove on one side with a first angle δ1 and a first depth d1 and a second bevel groove on another side thereof with a second angle δ2 and a second depth d2, wherein said first angle δ1 is from 100° to 140°, wherein said second angle δ2 is from 40° to 80°, and wherein the sum of said first depth and said second depth is from 70% to 95% of said second member thickness.

8. A process according to claim 1 wherein said first and second members are each individually selected from the group consisting of an extruded profile, a sheet and a plate.

9. A process according to claim 1 wherein said first and second members are fixed with a clamping device comprising means for maintaining a back pressure of said inert gas above atmospheric pressure, and wherein a finished weld-brazed assembly is obtained after a single welding run.

10. A process according to claim 1 wherein said aluminum alloy comprises a fusion weldable alloy from 2XXX, 5XXX, 6XXX or 7XXX alloy families.

11. A process according to claim 10 wherein said aluminum alloy is heat treatable.

12. A process according to claim 11 wherein said first member is in T3X or T4X temper during said heating and, and further comprising following step (iii)

(iv) aging said first member to a T6X or T8X temper.

13. A process according to claim 1 wherein heating is obtained from arc welding with a consumable electrode.

14. A process according to claim 9 wherein said clamping device comprises an upper face adapted to press against said members to be weld-brazed together, a channel, a means for tightening said members onto said upper face in order to obtain a substantially leak free pipe having said channel and members for walls, a means for introducing a gas into said pipe and a means for obtaining a pressure of said gas in said pipe above atmospheric pressure so that said pressure forces the aluminum alloy melt onto said second member during weld-brazing.

15. A weld-brazed assembly obtainable according to the process of claim 10 comprising a first extruded member comprising a fusion weldable alloy from at least one of 2XXX, 5XXX, 6XXX or 7XXX alloy families and a second extruded member comprising a titanium alloy and having at least one edge with a thickness e and a tapered truncated shape having on a first side thereof a first tapering angle α1, and on a second side thereof a second tapering angle α2 and a minimum thickness t, wherein α1 and α2 are greater than or equal to zero, the sum of α1 and α2 is from 10° to 50° and t is between 0.05 e and 0.3 e.

16. A weld-brazed assembly according to claim 15 wherein the ultimate tensile strength of said assembly is at least 260 MPa.

17. A method for fabrication of a structural element for the aerospace industry comprising using a weld-brazed assembly of claim 15.

18. An aircraft seat track comprising a weld-brazed assembly according to claim 15.

19. A weld-brazed assembly comprising a first extruded member comprising a fusion weldable alloy from at least one of 2XXX, 5XXX, 6XXX or 7XXX alloy families and a second extruded member comprising a titanium alloy and having at least one edge with a thickness e and a tapered truncated shape having on a first side thereof a first tapering angle α1, and on a second side thereof a second tapering angle α2 and a minimum thickness t, wherein α1 and α2 are greater than or equal to zero, the sum of α1 and α2 is from 10° to 50° and t is between 0.05 e and 0.3 e.

20. A weld-brazed assembly according to claim 19 wherein the ultimate tensile strength of said assembly is at least 260 Mpa.

* * * * *